US00RE34073E

United States Patent [19]

Suzuki

[11] E Patent Number: Re. 34,073

[45] Reissued Date of Patent: Sep. 22, 1992

[54] METHOD OF ANNOUNCING LOW LEVEL OF REMAINING LIQUID IN DROPPER

[75] Inventor: Takeo Suzuki, Kawasaki, Japan

[73] Assignee: Toho Plastic Co., Ltd., Kawasaki, Japan

[21] Appl. No.: 637,572

[22] Filed: Jan. 3, 1991

Related U.S. Patent Documents

Reissue of:

[64] Patent No.: 4,896,099
Issued: Jan. 23, 1990
Appl. No.: 284,040
Filed: Dec. 14, 1988

[30] Foreign Application Priority Data

Feb. 10, 1988 [JP] Japan ..... 63-30591

[51] Int. Cl.[5] ..... G08B 21/00; G01F 23/00

[52] U.S. Cl. ..... 324/687; 324/660; 324/689; 73/304 C; 340/620

[58] Field of Search ..... 73/304 C; 340/620; 324/687, 660, 689

[56] References Cited

U.S. PATENT DOCUMENTS

| | | | |
|---|---|---|---|
| 3,631,437 | 12/1971 | Campbell | 340/620 |
| 3,939,360 | 2/1976 | Jackson | 340/620 |
| 4,002,996 | 1/1977 | Klebanoff | 324/668 |
| 4,083,038 | 4/1978 | Klebanoff | 340/620 |
| 4,099,167 | 7/1978 | Pomerantz | 340/620 |

*Primary Examiner*—Kenneth A. Wieder
*Assistant Examiner*—Jose M. Solis
*Attorney, Agent, or Firm*—Armstrong, Nikaido, Marmelstein, Kubovcik & Murray

[57] ABSTRACT

This invention relates to a method of annoucing a low level of the remaining liquid in a dropper. According to the present invention, two electrodes are attached to the outer surface of a dropper, and a pulse of a stable level is applied to one of these electrodes. The remaining quantity of the liquid in the dropper can be detected automatically with ease by utilizing the variations of the electrostatic capacity occurring between these two electrodes. An annunciator is activated when it receives a signal representative of a low level of the liquid in the dropper, to inform a nurse of the necessity of replacing the dropper.

2 Claims, 5 Drawing Sheets

METHOD OF ANNOUNCING LOW LEVEL OF REMAINING LIQUID IN DROPPER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method of announcing a low level of the remaining liquid in a dropper.

2. Description of the Prior Art

In a conventional method of this kind, a patient who is administered a liquid dropwise ascertains visually a low level of the remaining liquid in a dropper, and informs a nurse of this fact through a microphone, which is placed by the bed of the patient, shortly before the liquid runs out. The nurse who has receive this vocal information then renews the dropper.

According to this method, in which a patient visually ascertains a low level of the remaining liquid in a dropper, he has to constantly care about when the liquid will run out. This is a very heavy mental burden on the patient, and compelling a patient to ascertain a low level of such a remaining liquid is primarily very unreasonable. It is necessary that this problem be solved as soon as possible so as to eliminate the patient's mental burden.

SUMMARY OF THE INVENTION

An object of the present invention is to provide a method of automatically announcing a low level of the remaining liquid in a dropper by attaching two elecrodes to the outer surface of the dropper, and applying a pulse to one of these electrodes to enable the remaining quantity of the liquid to be detected easily by utilizing the variation of the electrostatic capacity between the two electrodes, whereby the above-mentioned unreasonable problem is solved.

The present invention, which has been developed with a view to solving the problems in a prior art method of this kind, is characterized in that two detecting electrodes are attached to the outer surface of the lower portion of a liquid-containing dropper, to one of which detecting electrodes a pulse of a stable level is applied, a difference between a level of the pulse passed through the interior of the dropper when the liquid exists therein as an electrode and that of the pulse passed through the inverior of the dropper when the remaining quantity of the liquid in the dropper decreases to such an extent that the liquid does not work as an electrode, both of which levels are determined in accordance with the electrostatic capacity between the two electrodes, being compared with a reference level, a judgement signal representative of unfavorable results of this comparison actuating an annunciator.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
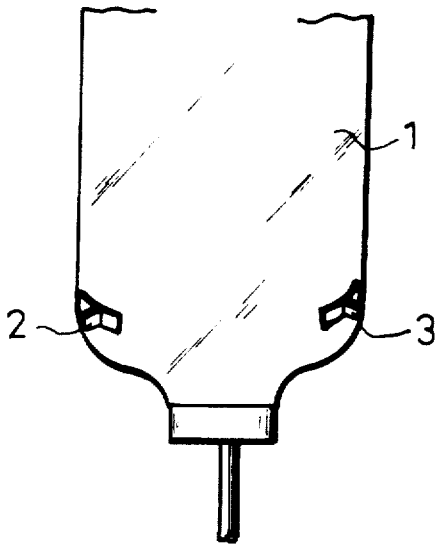
FIG. 1 is a front elevation of a part of a dropper with detecting electrodes attached thereto.
Figure 2:
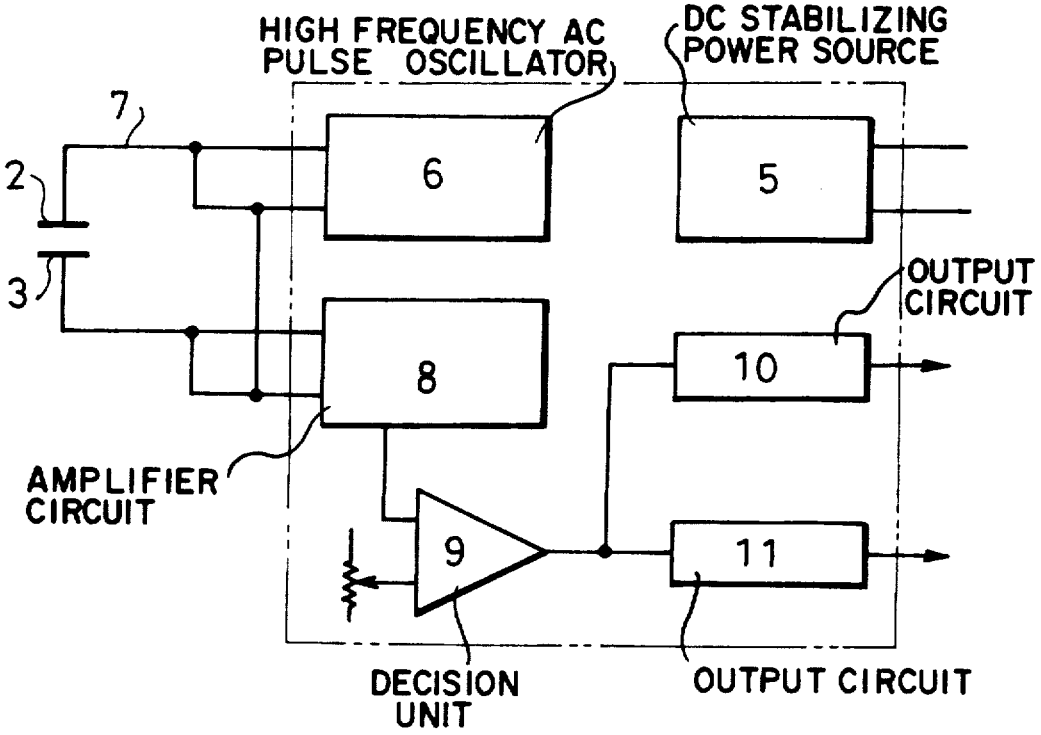
FIG. 2 is a block diagram of a circuit of a driving unit used when the method according to the present invention is practiced.

Referring to FIG. 1, reference numeral 1 denotes a glass bottle or a dropper consisting of a medially soft synthetic resin, which is hung from a suspender (not shown), with two detecting electrodes 2, 3 pasted on the lower portion of the dropper 1. Each of the detecting electrodes 2, 3 is formed by bending aluminum foil suitably, this bent aluminum foil being pasted on the dropper 1. A driving unit 4 shown in FIG. 2 is connected to these detecting electrodes 2, 3.

In this driving unit 4, an AC pulse of a stable output level is generated by a high-frequency AC pulse oscillator 6 which receives the supply of an electric current from a dC stabilizing power source 5, and this pulse is guided via a detecting wire 7 such as a shielded wire, which is connected to one detecting electrode 2 via a conductive chip (not shown) attached to the detecting wire 7. The other detecting electrode 3 is also connected to the input side of an amplifier circuit via an identical detecting wire 7. A suitably amplified signal is detected, and the level of this signal is compared with a reference level in a decision unit 9, a decision being made therein. The results of the decision is inputted to an operating circuit for an annunciator, which consists, for example, of a buzzer (not shown), through output circuits 10, 11.

Figure 3:
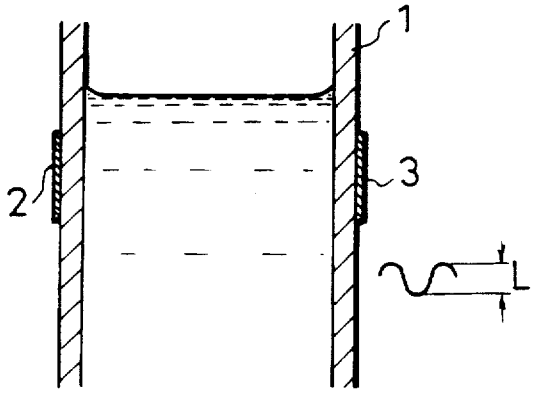
FIGS. 3-6 are diagrams showing the principle of the operations according to the present invention.

FIG. 3 shows the condition in which a liquid exists between the detecting electrodes 2, 3. A case where an AC pulse having a stable level is applied to the detecting electrode 2 will now be discussed. When the dropper 1 consists of an electrically insulating material, it works as a dielectric. According, the pulse thus applied to the detecting electrode 2 passes through the dropper 1 and is transmitted to the liquid therein.

When the liquid is electrically conductive, it works as an electrode, and the pulse is transmitted to the opposite side of the dropper and then to the detecting electrodes 2, 3 through the dropper again.

The quantity of energy of the pulse thus transmitted to the detecting electrodes 2, 3 is determined in accordance with the electrostatic capacity formed between the detecting electrodes 2, 3, and the electrostatic capacity varies in proportion to the opposed areas of the electrodes and in inverse proportion to the distance therebetween. Therefore, the quantity of energy of the pulse transmitted to the electrodes 2, 3 in the condition shown in FIG. 3, in which the liquid is interposed as an electrode between the electrodes 2, 3, is larger than that of the energy of the pulse transmitted to the electrodes 2, 3 in the condition shown in FIG. 4, in which the liquid is no longer interposed as an electrode between the same electrodes 2, 3. Consequently, the levels of the pulses passing between the electrodes 2, 3 in these two cases differ in amplitude as shown by $L_1$, $L_2$ in FIGS. 3 and 4.

Therefore, if the reference level in the level decision unit 9 is set between these levels $L_1$, $L_2$, the presence and absence of the liquid in the dropper can be determined.

Figure 4:
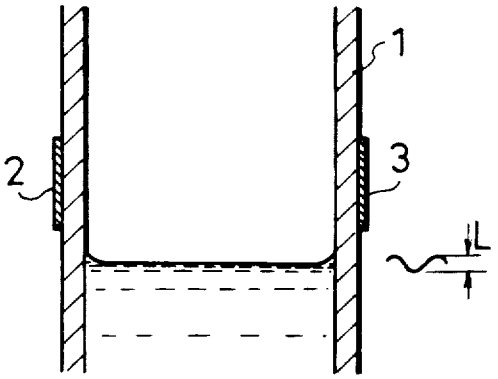
Figure 5:
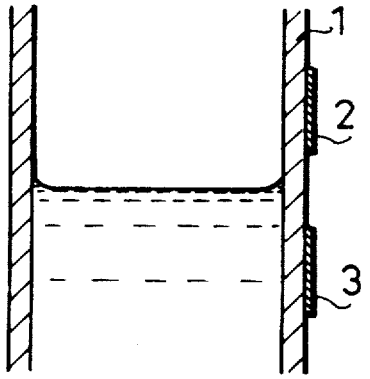

In the dropper shown in FIGS. 3 and 4, the detecting electrodes 2, 3 are provided in a laterally opposed state. Even when the detecting electrodes 2, 3 are provided in a vertically spaced manner as shown in FIG. 5, they are, of course, operated in the same way.

Figure 6:
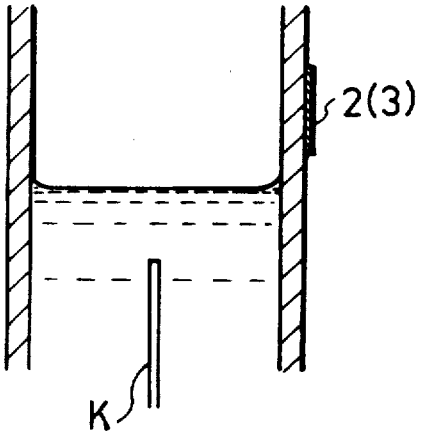

Also, even when, for example, an air introducing needle K, which is thrusted into a dropper 1 as shown in FIG. 6, is used as an electrode instead of the detecting electrode 2 or 3, the electrodes are, of course, operated in the same way as mentioned above, though the path along which the pulse passes is shortened.

Figure 7:
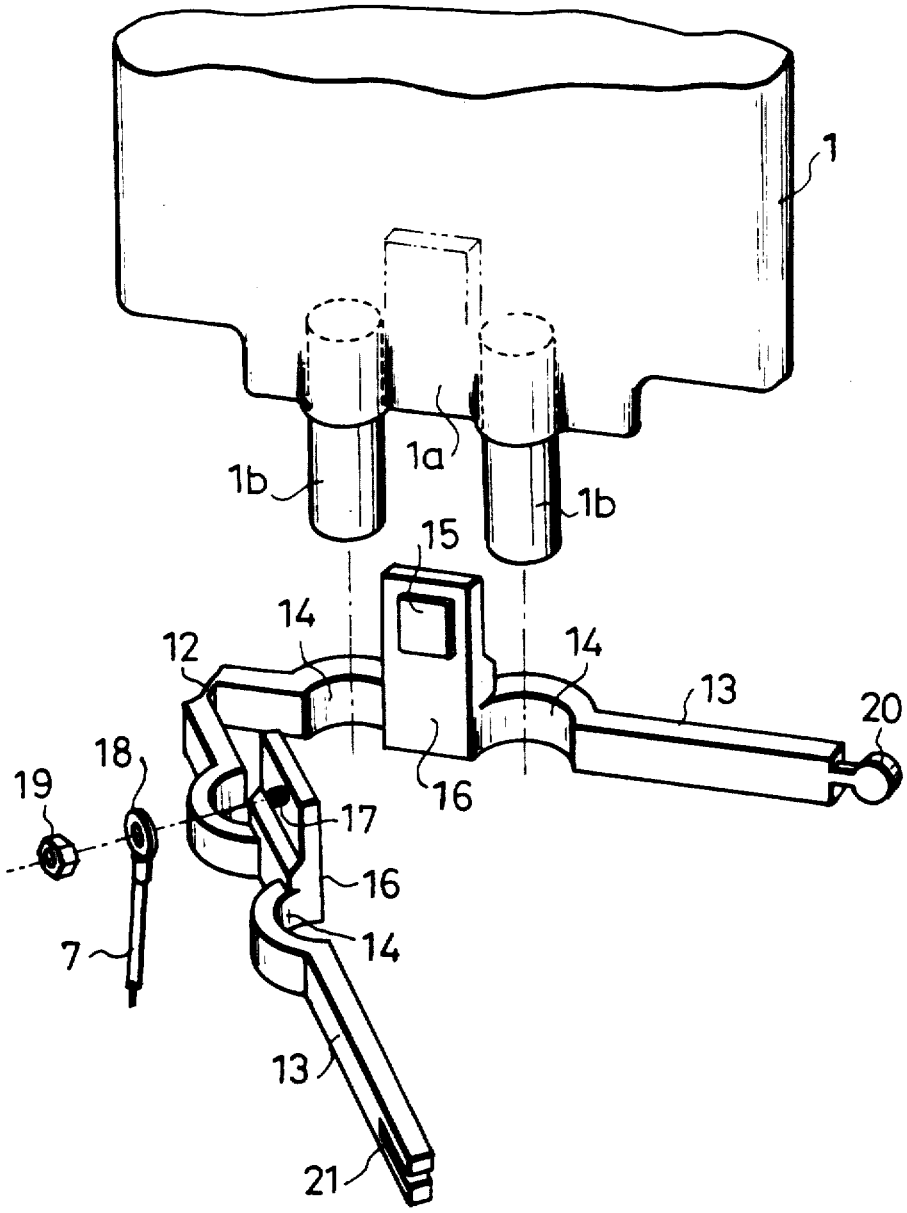
FIG. 7 is a perspective view of another example of a detecting electrode.

FIG. 7 onward show a modified example of the detecting electrodes. Since the previously-described detecting electrodes 2, 3 are formed out of aluminum foil, they require a troublesome operation every time they are put to use, i.e., they have to be bent to obtain projecting electrodes. The example showing in FIGS. 7–10 consists of clip type detecting electrodes which can simply be attached to a dropper 1 in a clamped state. These detecting electrodes are employed only when the dropper 1 consists of a bag of a medially soft synthetic resin. The construction of these detecting electrodes will now be described.

These detecting electrodes consist of a pair of openable bars 13 of a synthetic resin having a hinge 12 at the joint ends thereof and adapted to be opened and closed via the fulcrum hinge 12, semicylindrical recesses 14 formed in an opposed state in the closing surfaces of the openable bars 13 so that two annular bores are formed when these openable bars 13 are closed on a dropper 1, projecting clamp portions 16 which are provided with metallic terminal plates 15 adapted to be opposed to each other when the openable bars 13 are closed, and which are formed between the recesses 14, bolts 17 one end portion of each of which is fixed to the relative terminal plate 15, and the other end portion of each of which is passed through the relative clamp portion 16 and exposed to the outside, washers 18 which have detecting wires 7 fixed thereto, and which are fitted over the outer end portions of the bolts 17, and nuts 19 screwed on the bolts 17 so as to fix the washers 18 in a pressed state to the outer surfaces of the clamp portions 16.

Reference numeral 20 denotes a flexible latch formed by extending the free end portion of one openable bar 13 and used to maintain the bars 13 is a firmly closed state, and a cut 21 in which this latch 20 is inserted in a locked state is provided in the free end portion of the other openable bar 13.

Figure 8:
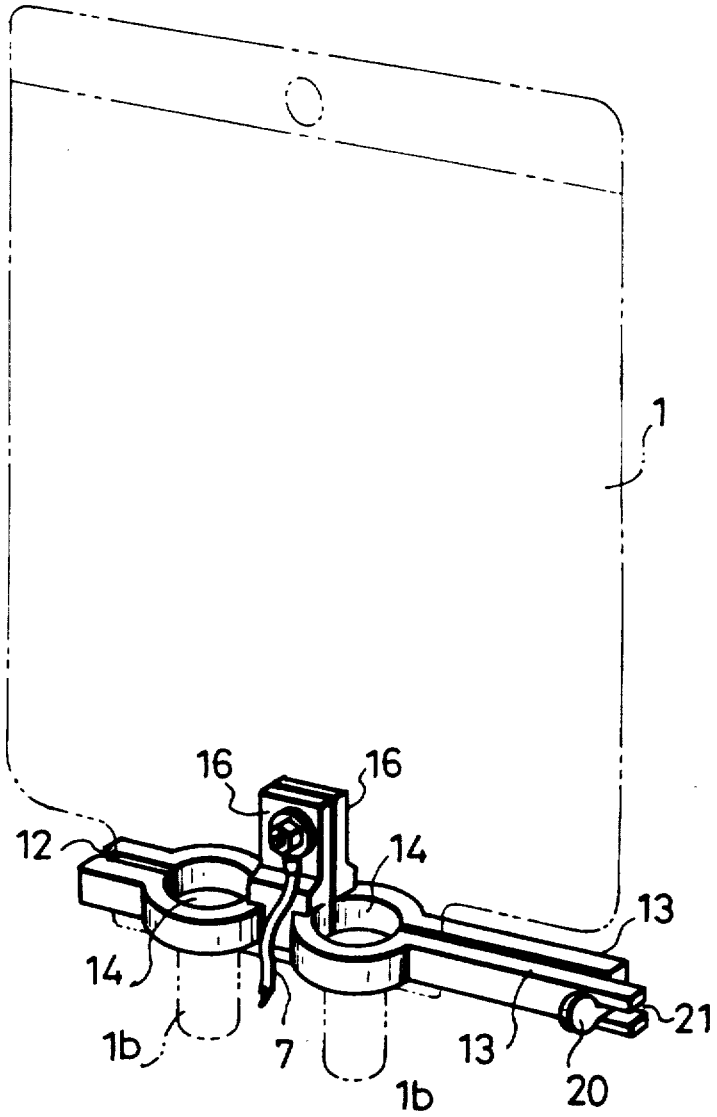
FIG. 8 is a perspective view of the detecting electrode of FIG. 7 which is attached to a dropper.
Figure 9:
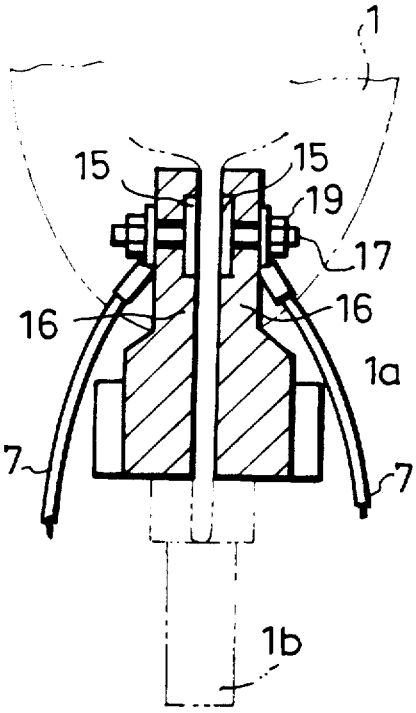
FIG. 9 is a sectional view of terminal strips in the detecting electrode of FIG. 7.
Figure 10:
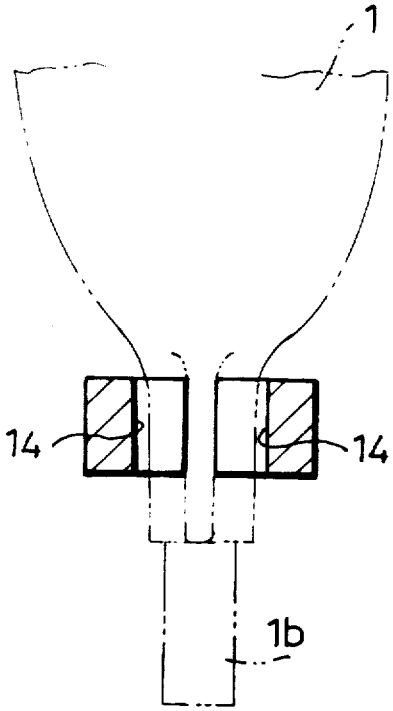
FIG. 10 is a sectional view of an annular bore in the detecting electrode of FIG. 7.

In order to attach the detecting electrodes thus constructed to a dropper (bag) 1, the two openable bars 13 are opened via the fulcrum hinge 12 as shown in FIG. 7, and a lower edge portion 1a of the dropper 1 is inserted between the clamp portions 16 with the left and right liquid discharge tubes 1b, which are provided on the dropper 1, inserted in the recesses 14. The bars 13 are then closed as shown in FIG. 8, so that the lower edge portion 1a of the dropper 1 is pressed from both sides thereof by the clamp portions 16. Consequently, the detecting electrodes are combined unitarily with the dropper 1. When the lower edge portion 1a is pressed by the clamp portions 16, the terminal plates 15 are also pressed in an opposed state against both side surfaces of the dropper 1. A pulse is applied to the electrode through the terminal plates 16 to detect the presence and absence of a liquid on the basis of the operational principle referred to above.

According to the present invention described above, a low level of the remaining liquid in the dropper is detecting automatically, and the annunciator is actuated by a signal representative of this information on the liquid to inform a nurse of the necessity of replacing the dropper. Especially, the structure used to practice the method according to the present invention has advantageous features that it is capable of detecting the remaining quantity of the liquid in the dropper easily and reliably by utilizing the variation of the electrostatic capacity, which occurs between the two electrodes on the dropper when a pulse is applied to one of the electrodes.

The present invention is not, of course, limited to the above embodiment; it may be modified in various ways within the scope of the appended claim.

What is claimed is:

1. A method of announcing a low level of the remaining liquid in a dropper, comprising the steps of:

applying a pulse of a stable level to at least one of detecting electrodes attached to an outer surface of a lower portion of a liquid-containing dropper;

comparing a level of said pulse passed through an interior of said dropper with a reference pulse level, said reference pulse level being between a level of said pulse passed through said interior of said dropper when said liquid exists therein for defining an electrostatic capacity between said detecting electrodes and that of said pulse passed through said interior of said dropper when a remaining quantity of said liquid in said dropper decreases to such an extent that a significantly reduced electrostatic capacity is defined between said detecting electrodes; and automatically actuating an annunciator when a judgement signal representative of unfavorable results derived from said step of comparing with said reference pulse level.

2. The method of announcing a low level of the remaining liquid in a dropper as in claim 1, wherein said step of applying a pulse of a stable level includes the steps of applying a certain level of pulses to an electrode, and obtaining a level of pulses at another electrodes, and wherein said step of comparing with said reference pulse level includes the step of comparing said level of pulses at said another electrode with said reference pulse level.

* * * * *